Figures 5, 6:
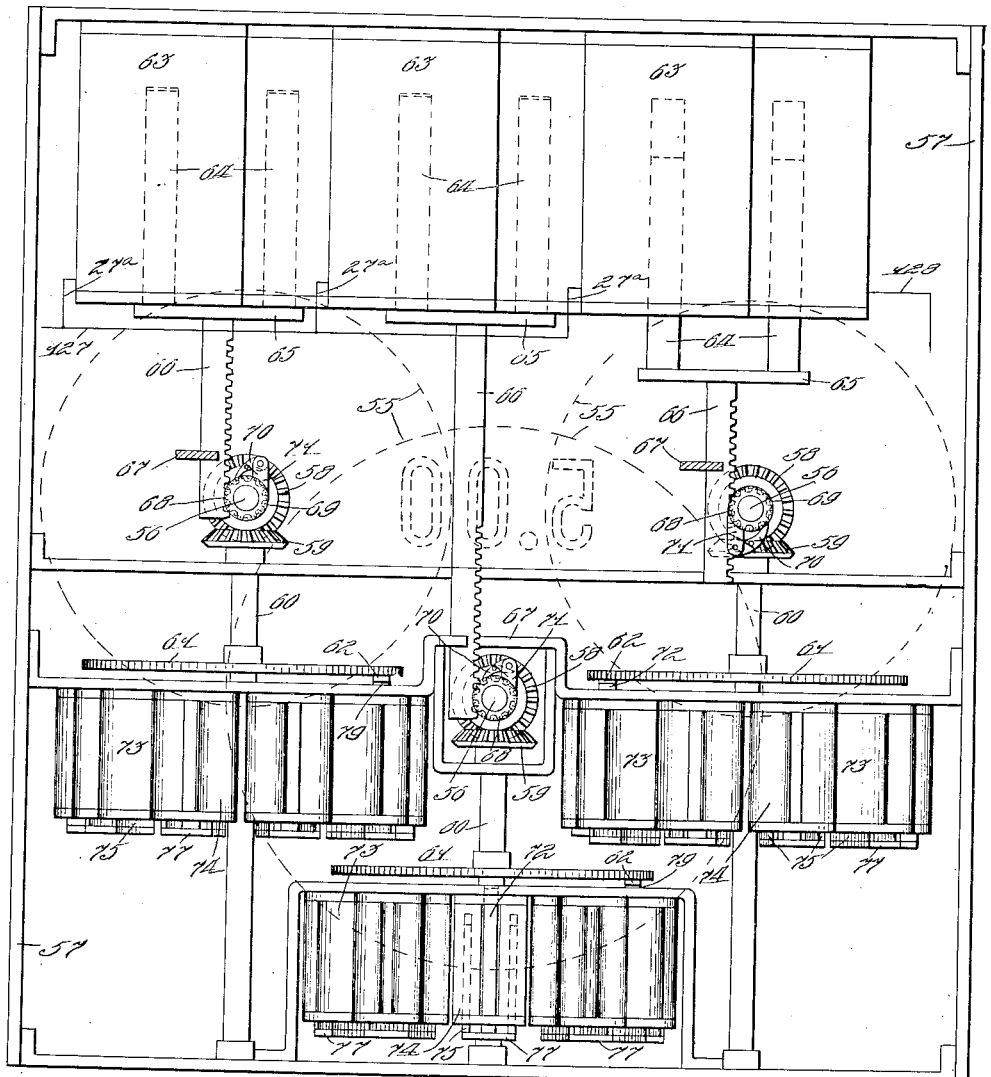

W. F. SCHWEIGER.
CASH REGISTER WITH DISTANT INDICATION.
APPLICATION FILED FEB. 19, 1904.
996,805.
Patented July 4, 1911.
8 SHEETS—SHEET 1.
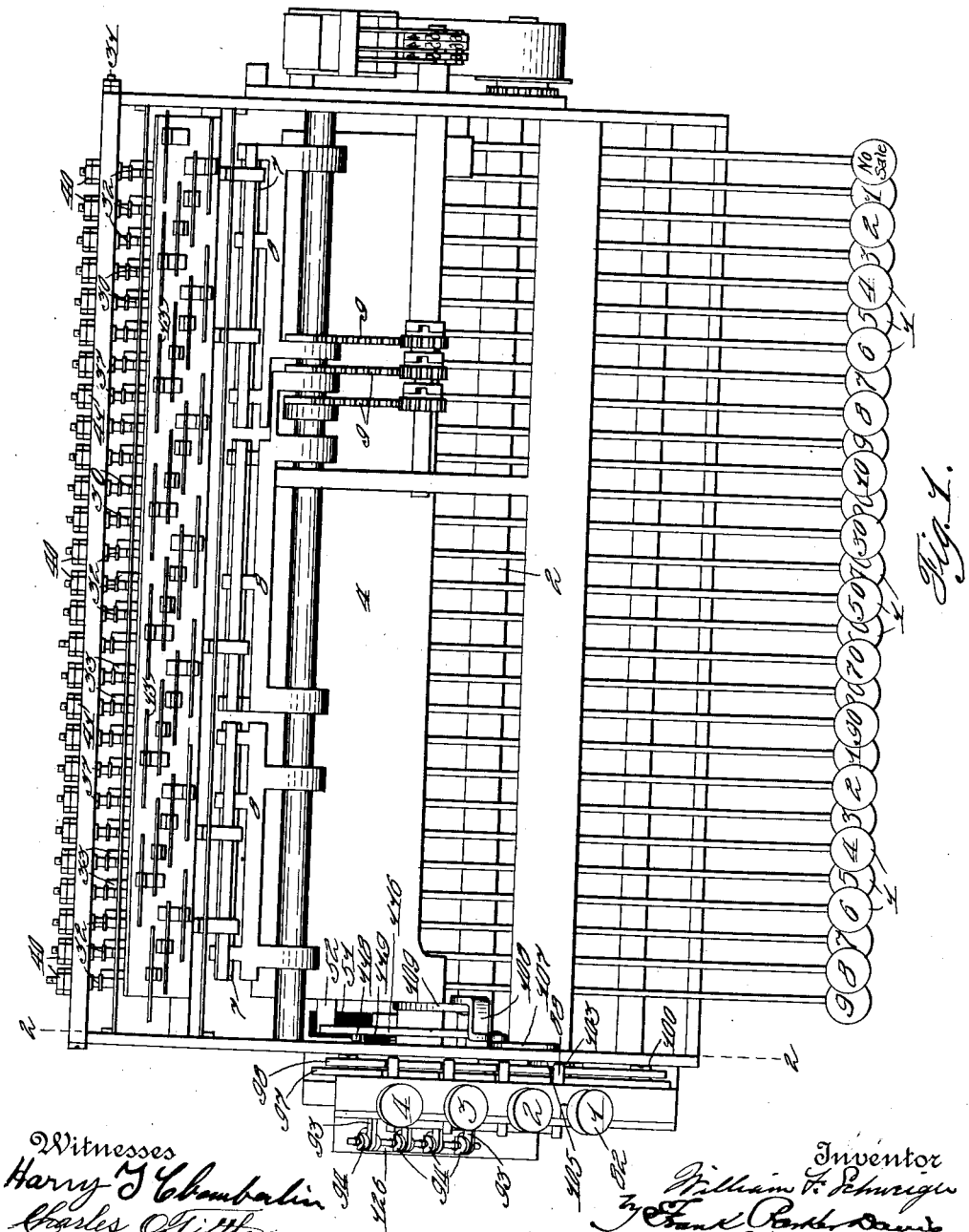

W. F. SCHWEIGER.
CASH REGISTER WITH DISTANT INDICATION.
APPLICATION FILED FEB. 19, 1904.
996,805.
Patented July 4, 1911.
8 SHEETS—SHEET 2.
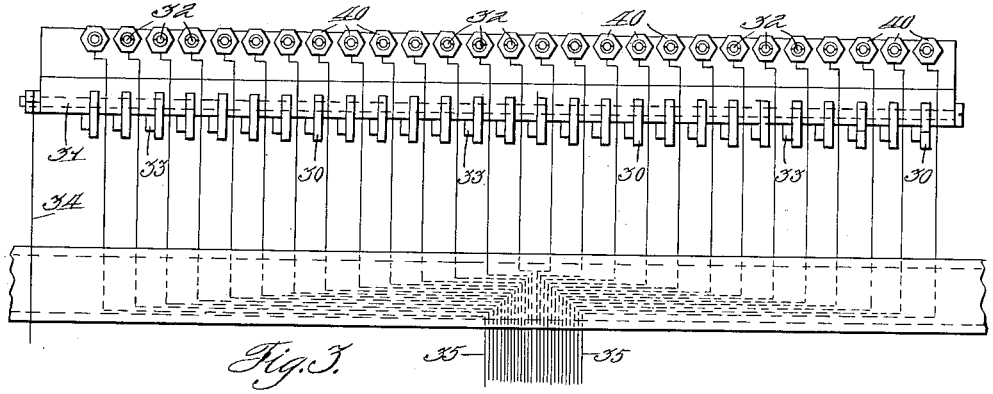
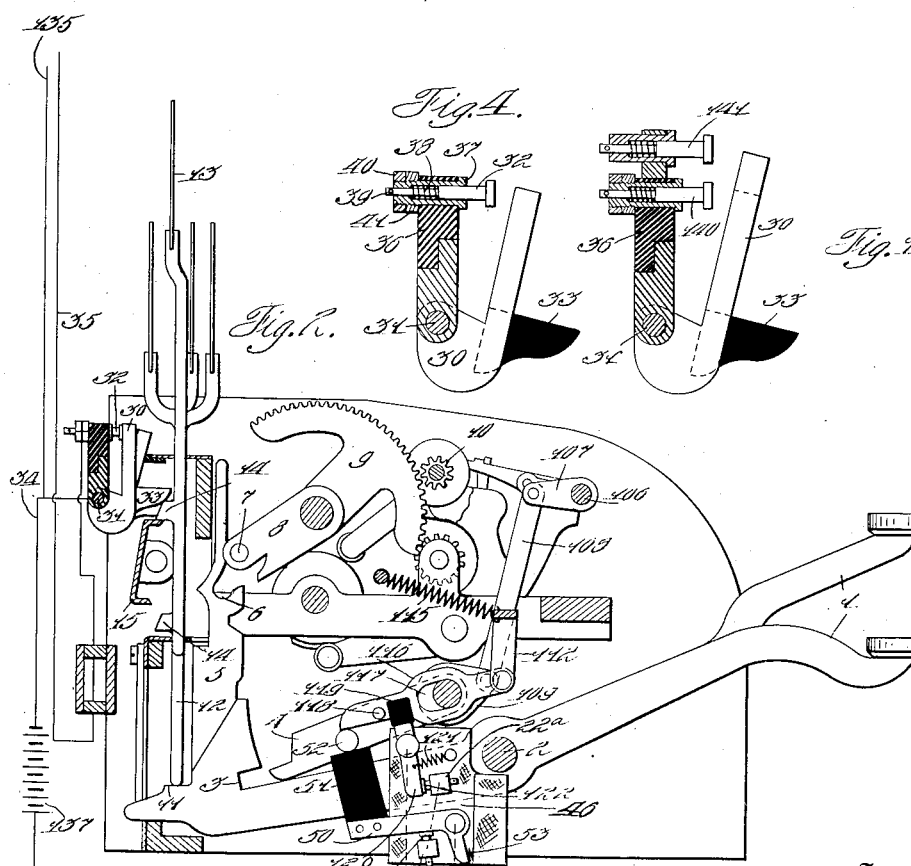

W. F. SCHWEIGER.
CASH REGISTER WITH DISTANT INDICATION.
APPLICATION FILED FEB. 19, 1904.

996,805.

Patented July 4, 1911.
8 SHEETS—SHEET 3.

Witnesses

Inventor
William F. Schweiger

W. F. SCHWEIGER.
CASH REGISTER WITH DISTANT INDICATION.
APPLICATION FILED FEB. 19, 1904.
996,805.
Patented July 4, 1911.
8 SHEETS—SHEET 4.
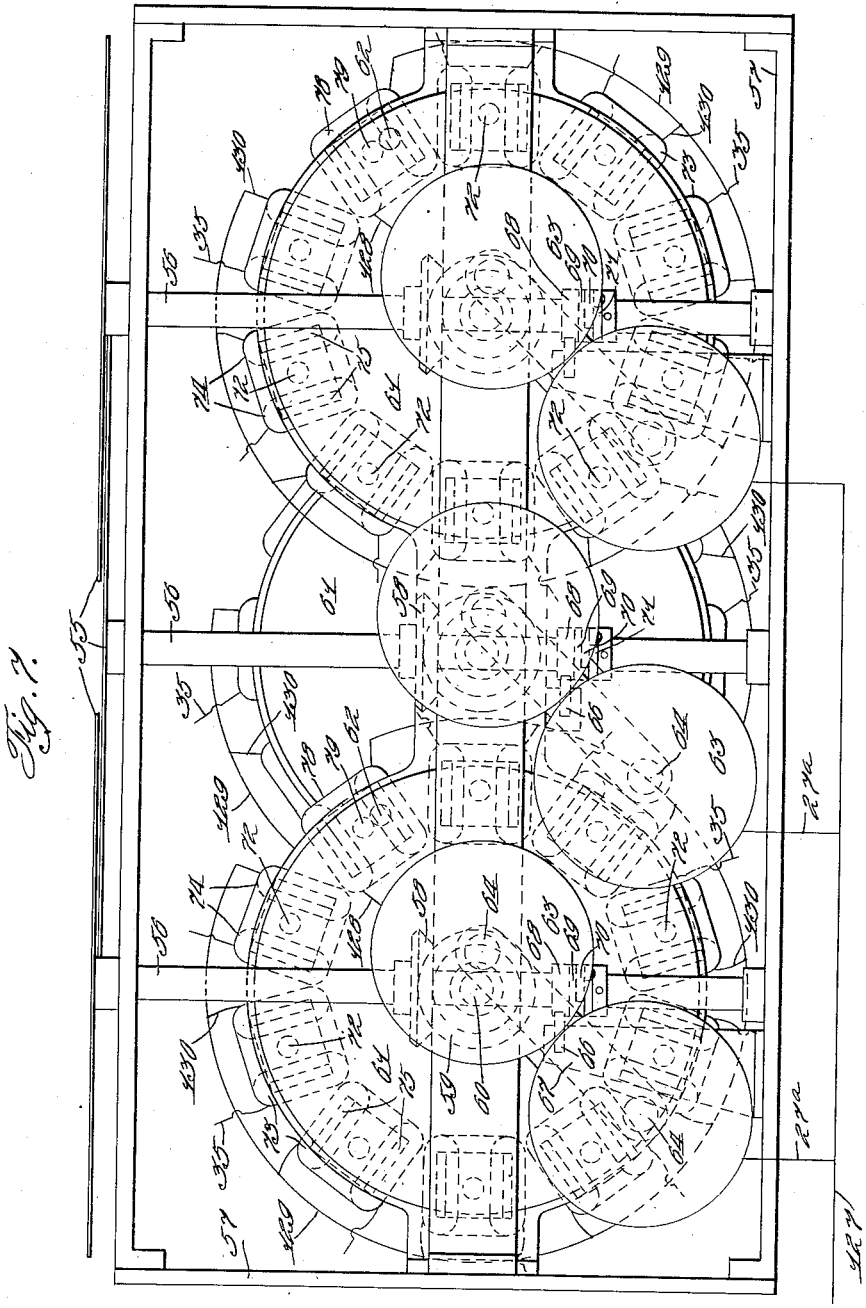

W. F. SCHWEIGER.
CASH REGISTER WITH DISTANT INDICATION.
APPLICATION FILED FEB. 19, 1904.
996,805.
Patented July 4, 1911.
8 SHEETS—SHEET 5.
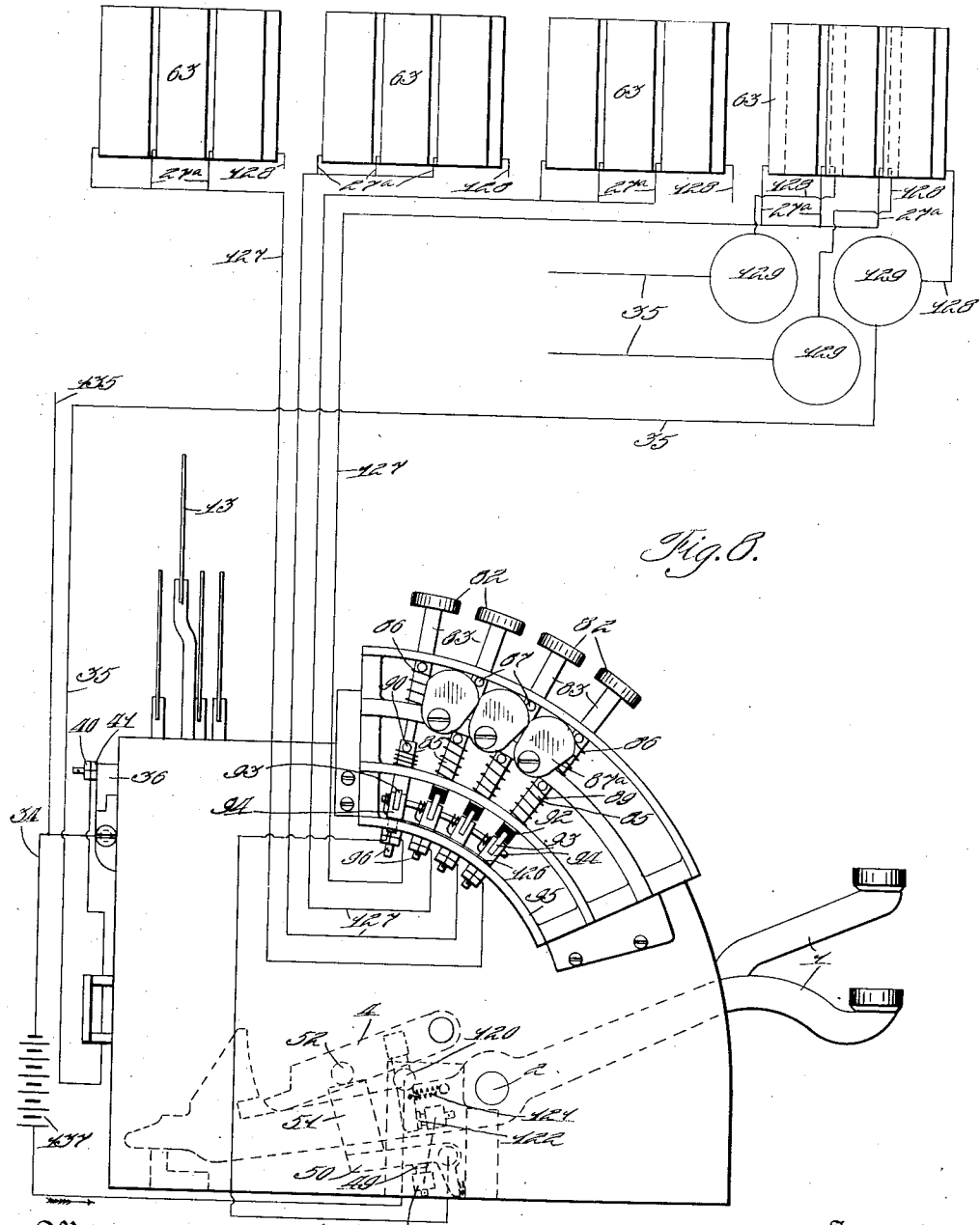

W. F. SCHWEIGER.
CASH REGISTER WITH DISTANT INDICATION.
APPLICATION FILED FEB. 19, 1904.
996,805.
Patented July 4, 1911.
8 SHEETS—SHEET 6.
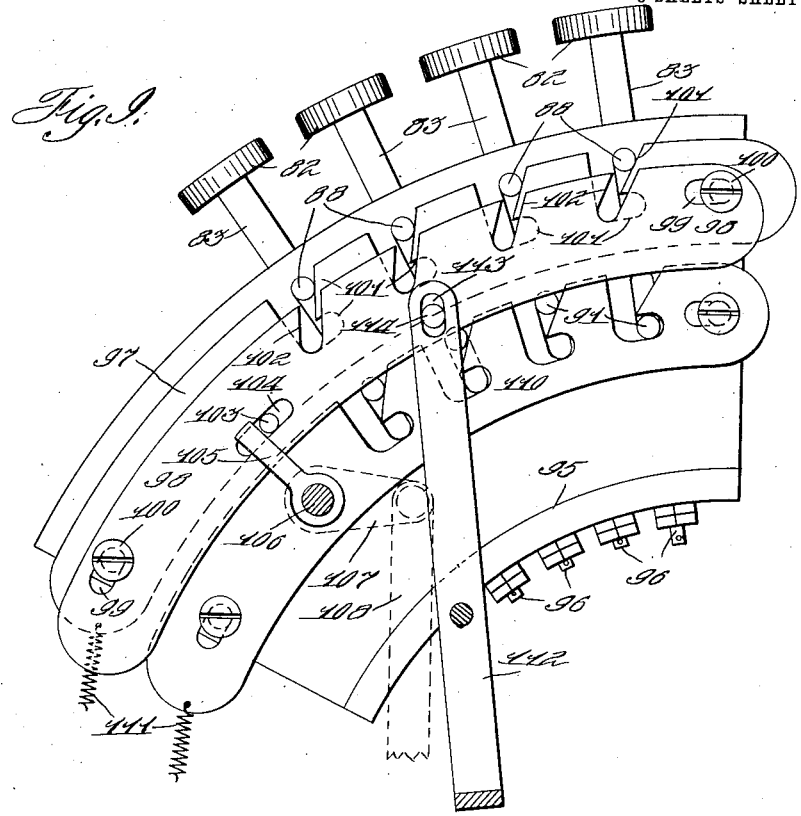
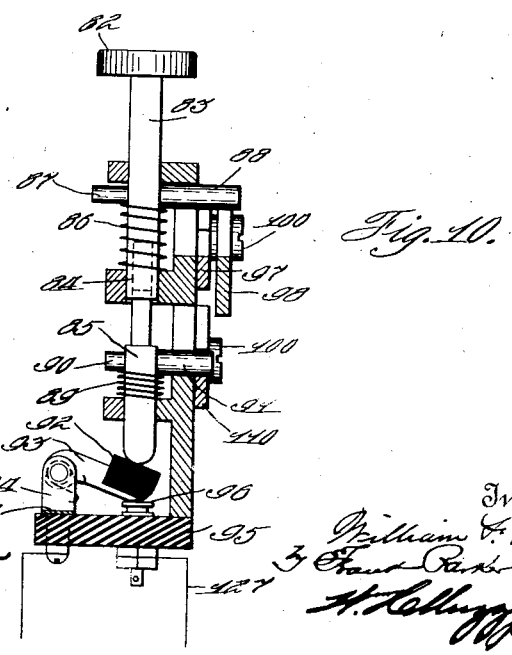

W. F. SCHWEIGER.
CASH REGISTER WITH DISTANT INDICATION.
APPLICATION FILED FEB. 19, 1904.
996,805.
Patented July 4, 1911.
8 SHEETS—SHEET 7.
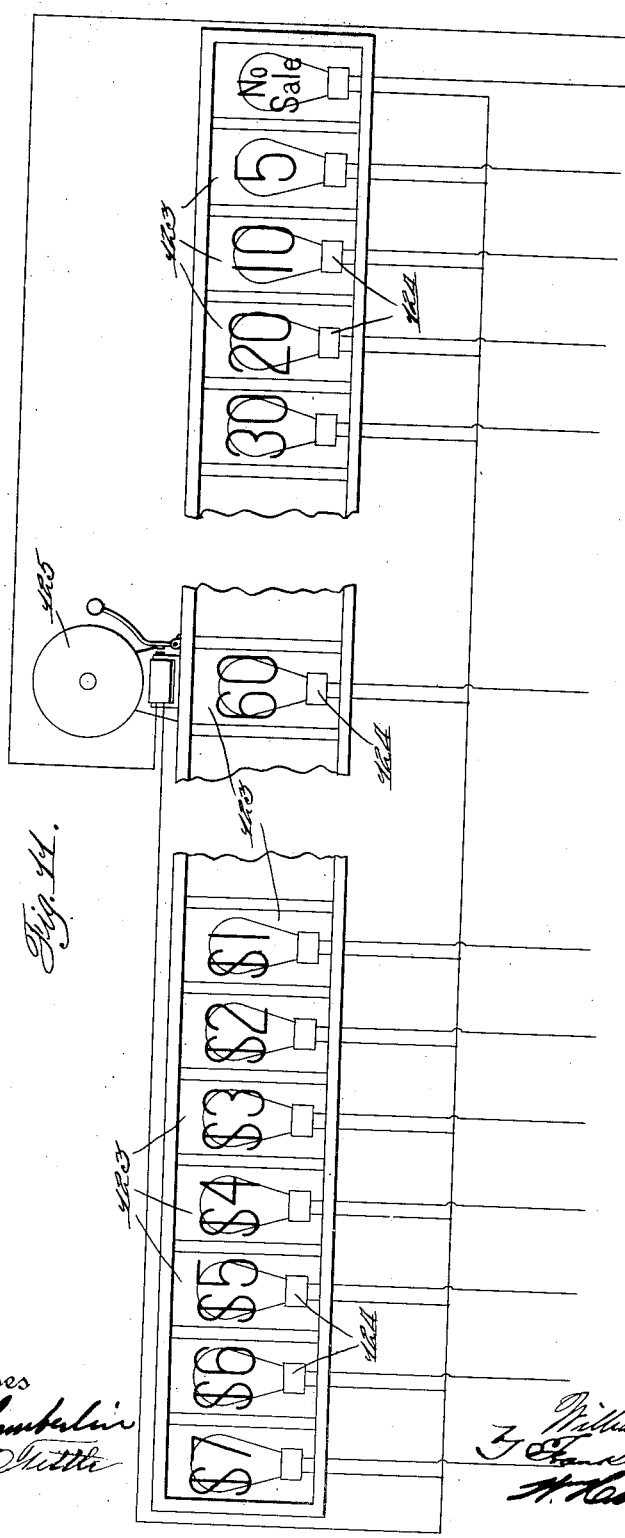

W. F. SCHWEIGER.
CASH REGISTER WITH DISTANT INDICATION.
APPLICATION FILED FEB. 19, 1904.
996,805.
Patented July 4, 1911.
8 SHEETS—SHEET 8.
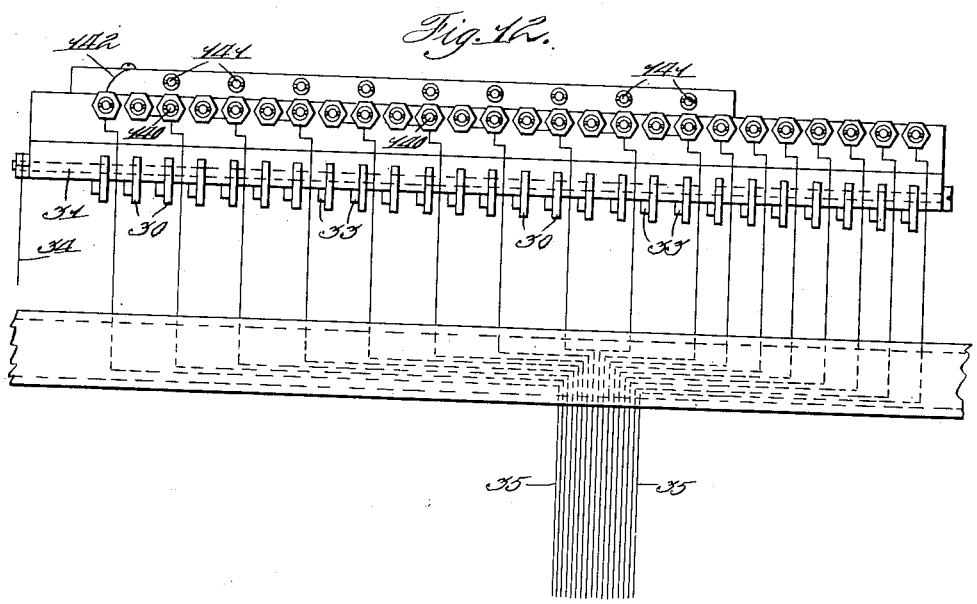
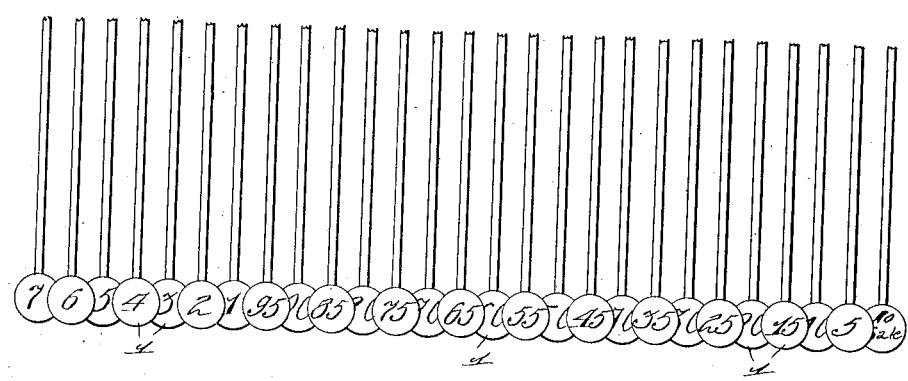
Witnesses
Inventor

UNITED STATES PATENT OFFICE.

WILLIAM F. SCHWEIGER, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER WITH DISTANT INDICATION.

996,805.   Specification of Letters Patent.   Patented July 4, 1911.

Application filed February 19, 1904. Serial No. 194,384.

*To all whom it may concern:*

Be it known that I, WILLIAM F. SCHWEIGER, a citizen of the United States, residing at Dayton, in the county of Montgomery and State of Ohio, have invented certain new and useful Improvements in Cash-Registers with Distant Indications, of which I declare the following to be a full, clear, and exact description.

This invention relates to improvements in cash registers and has more particular relation to improvements in indicating devices for the same.

One of the several objects of the invention is to provide improved devices for indicating at a distance the different transactions recorded on a register.

Another object of the invention is to provide devices for indicating at different selected distant points certain transactions recorded on a register at a fixed point.

With these and incidental objects in view, the invention consists in certain novel features of construction and combinations of parts, the essential elements of which are set forth in appended claims and preferred forms of embodiment of which are hereinafter specifically described with reference to the drawings which accompany and form part of this specification.

Of said drawings: Figure 1 represents a top plan view of a cash register with my improvements applied thereto; the cabinet of the same being removed. Fig. 2 represents a transverse vertical section through the same on the line 2—2 of Fig. 1; the cabinet and cash drawer being omitted and part of the wiring shown in diagram. Fig. 3 represents a detail rear elevation of the switchboard of the machine. Fig. 4 represents a detail vertical section partly in elevation of one of the switches. Fig. 5 represents a rear elevation of one of the sets of indicators and operating devices therefor. Fig. 6 represents a detail side elevation of one of the zero magnets and connections. Fig. 7 represents a top plan view of one of the indicator groups. Fig. 8 represents a detail side elevation of the machine, showing the bank of special clerks' keys; the wiring to the respective independent indicators being shown in diagram. Fig. 9 represents an enlarged detail side elevation of the special clerks' keys and their detents. Fig 10 represents an approximately vertical transverse section through the same. Fig. 11 represents a modified form of indicator that can be used in connection with the form of machine illustrated, but preferably with the arrangement shown in Figs. 12 to 14 inclusive. Fig. 12 represents a view similar to Fig. 3, of the modified form of the invention. Fig. 13 represents a top plan view of the keyboard arrangement employed in this modified form; and Fig. 14 represents a vertical section through the construction shown in Fig. 12.

The type of machine to which the present improvements are shown as applied is what is known in the art as a one-movement or key-operated machine. Such a type of machine is fully shown and described in Letters Patent of the United States to Thomas Carney, No. 497,860, dated May 23, 1893, and said patent will be referred to for any detail description not herein given.

Described in general terms, such a machine as above mentioned comprises a series of key levers 1 journaled upon a transverse shaft 2 and provided at their rear ends with slotted hook projections 3 which coöperate with a pivoted key coupler 4 to compel a simultaneous movement of the several keys operated. Each of the keys or levers 1 is provided with a lifting standard 5, the projection 6 of which is arranged to engage a cross-bar 7 of a registering frame 8 to move the same to a greater or less distance according to the value of the key operated. Each of the frames 8 is provided with a segmental rack 9 constructed to engage pinions 10 on the respective counter wheels when the counter is rocked rearward. Each of the key levers 1 is further formed with a shoulder 11 upon which rests an indicator stem or standard 12 carrying a tablet indicator 13 at its upper end. Each of the indicator stems 12 is provided with a beveled lug 14 which is arranged to coöperate with a rocking frame 15 to support the indicator in its elevated and exposed position. At the proper period in the initial movement of the machine the frame 15 is rocked in a manner well known in the art to release any elevated indicators and permit them to descend to their lower positions. The mechanisms above described are common to all of the amount keys.

As before stated, each of the indicator stems 12 is provided with a bevel lug 14 which, when the indicators are elevated, passes above the upper edge of the back rod 15 and thus latches the indicator in its upper position. The bevel projections 14 are utilized to throw the respective switches of the electrical apparatus. Each of these switches comprises a pivoted lever 30 mounted upon a transverse rod 31 and a spring-pressed plunger 32 arranged to be engaged by the contact lever. The lever 30 is provided with a fiber cam nose or projection 33 which is arranged to be engaged by the lug 14 of its respective indicator stem and forced forward so as to bring the upper end of the lever in contact with the spring-pressed plunger 32, as shown in Fig. 2. The rod 31 is connected to one of the wires 34 of the circuit, as plainly shown in Fig. 3, while each of the plungers 32 is connected by an individual wire 35 with its respective operating magnet, as hereinafter more fully described. The fiber cross rod 36 of the frame of the machine is provided with a series of metal sleeves 37, screw-threaded at their rear ends and recessed to receive the plungers 32 and their actuating springs 38, as plainly shown in Fig. 4. The plungers 32 are limited in their movements by transverse pins 39 mounted in their rear ends and engaging the rear ends of the sleeves 37. Two nuts, 40 and 41, are mounted upon the rear end of each sleeve 37 for binding the circuit wire between them.

It will be seen from the above description that all of the levers 30 are in circuit with the main circuit rod 31 and that when any key is operated its respective lever 30 is forced rearward until its upper end contacts with its respective plunger 32 which is insulated from all the remaining plungers. The circuit for that particular key will thus be closed without affecting the remaining circuits. As the indicator stems are held elevated by the back rod 15 the circuits will remain closed as long as the indicators remain elevated.

The above described connections pertain exclusively to the amount keys of the machine and a description will now be given of the special or clerks' or room keys 82. These keys, as best shown in Fig. 1, are located in a bank by themselves at the left-hand end of the machine. In the present instance there are shown four of these special keys only but it will be readily understood that any desired number may be employed without departing from the spirit of this invention. Each of these keys 82 comprises a key shank 83, formed in its end with a recess 84 into which a lower plunger 85 projects, as best shown in Fig. 10. The shank 83 is suitably guided in the main frame and is normally forced outward by a coil spring 86 interposed between pins 87 and 88 and a portion of the main frame. The plunger 85 also tends to move normally outward because of a coil spring 89 interposed between pins 90 and 91 and the main frame. The lower end of the plunger 85 is arranged to contact with a fiber block 92 mounted on a pivoted contact piece 93 which is mounted in turn in a standard 94 secured to a fiber plate 95. This plate 95 carries a spring contact piece 96 similar in construction to the regular contact pieces of the amount keys.

When any one of the keys 82 is depressed its respective plunger 85 is also depressed and by contacting the block 92 on the piece 93 the latter is forced into contact with the contact plunger 96 and the circuit for that particular key completed. The pins 88 of each of the key shanks coöperate with segmental detent 97 and locking plate 98 mounted by slot and pin connection 99 and 100 upon the main frame. The sliding detent 97 is provided with a series of bevel-edge hooks 101 while the locking plate 98 is formed with a series of inclined slots 102. The office of the detent 97 is to latch the respective key shanks in their depressed positions. The office of the locking plate 98 is to lock all the keys against operation after one of the same has been operated and until it is returned to its normal position. The detent 97 is operated to release the depressed key by means of a pin 103 fast thereto and projecting through a slot 104 formed in the plate 98. A crank arm 105 contacts with the pin 103 and is fast upon a rock shaft 106 mounted in the main frame. This shaft 106 has fast upon it another crank arm 107 which is connected by a link 108 to an arm 109 secured to the key coupler. (See Fig. 2). By this means the operation of the key coupler by one of the amount keys will draw down upon the link 108 and arm 107 and thus rock the shaft 106 and cause the crank arm 105 to force the detent 97 upward and release the depressed key. When a depressed key is so released, however, it returns to its normal position alone as its respective plunger 85 is still held in its depressed position by an independent detent 110, similar to the detent 97, and coöperating with the pins 91 of said plungers 85. The depressed plunger remains in its operated position until another key is operated when the pin 91 of the same will force the detent 110 upward and rearward and thus release said depressed plunger. Each of the detents 97 and 110 is normally drawn forward and downward by a coil spring 111 which connects it to the main frame.

A simultaneous operation of more than one of the special keys is prevented by a series of pivoted tumbler plates 87ª pivoted to the main frame and coöperating with the pins 87 of the keys, as shown in Fig. 8. When one of the keys is forced downward its pin forces two adjacent plates apart in a manner well known in the art and thus locks all the remaining keys against operation.

It will be seen from the above description that while the special key itself returns to its normal position upon the operation of the machine the contact piece 93 controlled by said key remains in its set or depressed position and thus assures an unbroken conductor for the current at this point until a succeeding operation of one of the special keys.

In addition to the switching devices described above a switching device controlled by the special keys is also provided so that when any one of said keys is depressed it will break the circuit to any of the rooms controlled by any one of the keys. The devices for effecting this result comprise a lever 112 mounted upon the main frame and formed at its upper end with an elongated slot 113 into which projects a stud or pin 114 mounted on the detent 98. The movement of this detent upon each operation of a special key will cause the lever 112 to be rocked upon its pivot against the tension of a coil spring 115 which connects said lever to the main frame, as shown in Fig. 2. The lower end of said lever is pivotally connected to a sliding bar 116 formed with an elongated slot 117 through which one of the key coupler trunnions passes. The rear end of the bar 116 rests upon the pin 52 to normally lock the machine and said bar is provided with a pin 118 which, when the bar is drawn forward to unlock the machine, contacts with an insulated block 119 mounted upon the upper end of a lever 120 which is pivoted upon the plate 46 which plate is made of insulating material. The lever 120 when unrestrained is drawn forward at its lower end by a coil spring 121 which is interposed between the said lever 20 and the plate 46. When drawn forward into this position the lower end of the lever contacts with a spring-pressed contact plunger 122 mounted in a metal block 22ª upon the plate 46.

As above stated, the slide 116 normally projects over the pin 52 and thus locks the keys by locking the key coupler. When any one of the special keys is operated, however, the bar or slide is drawn forward and thus frees the key coupler to unlock the machine. By this means a clerk is compelled to use the circuit connections for some one of the indicators before he can operate the amount keys or the "No sale" key. In the event of his operating the "No sale" key the indicator in a certain room will be illuminated but will only show a series of zero indications.

As best shown in Fig. 2 the circuit normally passes through the contact plunger 122 and the lever 120, from which it results that whenever one of the special keys is depressed and the lever 120 operated through the aforesaid connections the main circuit will be broken and all lights or indicators in any of the rooms connected to the machine, extinguished. The circuit is not then reëstablished at this point until after one of the amount keys is operated and through the key-coupler connection releases the depressed special key allowing the detent 98 to assume its normal position and the sliding bar 116 to retreat.

Sparking at the amount key switches is avoided by the above described means as the circuit is broken by the depression of a special key before the amount key switches are released. To prevent the circuit being again made notwithstanding new amount key switches have been set and the contact has again been made between 120 and 122, an auxiliary switch is employed as follows:—Fiber plate 46 is provided with a contact block 47 which supports a spring contact plunger 49 similar to the plungers 32 and is in electrical connection with block 22ª as indicated by broken lines in Fig. 2. A pivoted bell crank lever 50 is mounted upon the plate 46 and is provided with an upwardly projecting fiber arm 51 which is normally forced into contact with the pin 52 projecting from the end of the key-coupler, by a coil spring 53 which is interposed between said bell crank lever and a portion of the plate 46. When the switch is in its normal position, shown in Fig. 2, the contact lever 50 is held down against the contact plunger 49 and the circuits are all closed. The initial movement of any key, however, by elevating the key-coupler permits the lever 50 to move upward and thus breaks the contact between said lever and the plunger 49. This condition obtains until the return of the key-coupler so that notwithstanding the coming together of 120 and 122 during the rise of the key-coupler there will be no indication until the completion of an operation of the machine. The function of the switch 50 may be likened to that of the customary flash for the tablets.

Having now described all of the switch connections of the machine a description of one type of indicators, shown in Figs. 5, 6 and 7 will now be given. These indicators are arranged in sets or groups, one of which is placed in each room or in different parts of a store or restaurant. Each of these indicators comprises three indicating disks 55 which, as best shown in Fig. 7, are mounted upon the outer ends of three horizontal shafts 56 which are mounted in a suitable rectangular frame 57. It will of course be understood that a suitable cabinet with indicator apertures is placed about the frame 57 so that only the indicating numerals shown in a dotted line position in Fig. 5 will appear through said indicator openings. Each of the indicator disks 55 is provided with ten characters arranged about its periphery running from zero to nine. Each of the shafts 56 is provided with a bevel pinion 58 which meshes with a similar pinion 59 fast upon one of a series of vertical shafts 60. Each of these shafts 60 is suitably journaled in the main frame and is provided with a horizontal disk 61 formed with a pendent lug 62 for a purpose hereinafter described. Three sets of double solenoid magnets 63 are arranged in the upper part of the frame 57 above the disks 61. The two movable solenoid cores 64 of each of these magnets are connected by a cross bar 65. This bar carries a pendent rack bar 66 guided by a stationary slotted bar 67 and meshing with a pinion 68 loosely mounted on the shaft 56. The pinion 68 is provided with a ratchet wheel 69 with which engages a spring-pressed pawl 70 mounted on an arm 71, fast to the shaft 56. From this construction it results that when the rack 66 descends the ratchet wheel 69 plays idly under the pawl 70 but when the movement of the rack bar 66 is reversed upon the magnet being energized the teeth of the ratchet wheel by their engagement with the pawl 70 cause the shaft 56 to rotate. This rotation of the shaft 56 also rotates its respective shaft 60 carrying the disk 61 until the lug 62 on said disks contacts with one of the plunger stops 72 of the individual magnets 73. As best shown in Figs. 5 and 7 these magnets 73 are arranged in groups, one group being located beneath each of the disks 61. Each of the magnets comprises two solenoid bobbins 74, connected solenoid cores 75 for the same and the stop plunger or rod 72 connected to a plate 77, which connects the solenoid cores. By this construction, when the magnets 73 are not energized all of the plunger stops 72 have dropped down to their lower positions so that their upper ends are out of the paths of the lugs 62 on the disks 61. When any one of the magnets is energized, however, the solenoid cores are drawn upward and thus project the stop rod carried thereby into the path of the lug 62 so that when the disk 61 is rotated, as above described, it will be arrested by the projecting plunger in such a position as to bring the correct character or numeral into position in front of the indicator opening.

The magnets above described provide for arresting the disk 61 at all of the indicating positions except the zero indicating positions. Means must be provided, however, whereby when no magnet in any one of the series is operated a stop will be projected into the path of the lug 62 so that the indicator will be arrested at the zero indicating position. To accomplish this result the tenth magnet 78 in each series is inverted, as shown in Fig. 6, so that its stop plunger 79 is normally forced upward by small coil springs 80 which are located within the magnets and under the solenoid cores. This magnet 78 is so wired as to be operated when any other magnet in that particular series is energized. From this it results that when any of the regular amount magnets are thrown into circuit the zero stop plunger 79 is drawn downward out of the path of the lug 62 of its respective disk 61.

The above construction results in such indicators as have been previously set to indicate amounts, being returned to their zero positions upon subsequent operations which do not include the operation of an amount magnet in that particular series. For example, should the indicators be set to indicate $5.55 and the next indication desired be $5.00 the tens-of-cents and units-of-cents indicating disks would be turned to indicate zero while the dollar indicating disk would not be turned at all. After the indicators have been set they are held firmly in set positions by the energy of the solenoid 63 which constantly tends to throw the racks 66 upward as long as the circuits remain closed by the switch levers 30.

In the modified form of indicators shown in Fig. 11 there is provided a frame divided into a series of compartments 123 in which are arranged suitable incandescent lights 124 wired up to the respective contact pieces of the numeral keys so that the operation of any particular key will cause the illumination of lights pertaining thereto. The front of each of said compartments 123 is covered by a transparent plate of glass or similar material upon which the numeral or character is formed or printed so that when the compartment is illuminated, the numeral or character will be plainly visible. This form of indicator is old and well known in the art, as shown in the patent to C. McNabb, No. 591,176, dated October 5, 1897. A suitable bell or audible signal 125 is also included in the circuit in such manner that it will be sounded upon every operation of the machine. It will of course be understood that one of this particular class of indicators may be located in each room and the circuit thereto controlled by its respec- the clerk's key.

The complete wiring between a number of such indicators and the machine for this form of indicator is not shown as it will not differ materially from the main wiring for the form of indicator shown in Figs. 6 and 7 and this is shown in Fig. 8. As shown in this figure all of the standards 94 of the contacting pieces 93 are connected by a strip of copper or other conducting material 126. Each of the contact plungers 96, however, is connected by a wire 127 to the three main solenoids 63 of its particular indicator; individual circuit wires 27$^a$ extending to each individual main solenoid. As best shown in the left-hand portion of Fig. 7, the bobbins of each main solenoid are connected by a wire 128 to the bobbins 78 of the individual zero magnet. The wire passes from these bobbins to a circular or ring wire 129. This wire is connected by a number of individual wires 130 to the individual numeral magnets. The return wire 35 passes from each of the individual magnets to its respective contact piece 32, as clearly shown in Figs. 6 and 7.

It will be seen from the above that if one of the amount keys is operated the circuit will be through the wire 127, a branch wire 27$^a$ of the bank to which the key pertains, through the main solenoid 63 of this particular bank, through the zero bobbin 78, through the bobbin pertaining to the particular key operated, through the wire 35 to the contact of the key operated and thence through the main switches back to the special key, as shown in Fig. 8. As shown in this Fig. 8 each of the pairs of main solenoids and its respective ring wire 129 is connected independently to a return wire 35. By this construction the main solenoids of any respective indicator are not energized until the contact of some amount key in the bank pertaining to said indicator has been made. If the solenoids were included in series instead of in individual circuits a solenoid of a particular indicator might very well be actuated in advance of the contact in its particular bank. Any danger of this difficulty is altogether avoided by making the main solenoids dependent upon their respective banks of switches.

The above construction, however, would ordinarily leave the circuit broken in a particular bank in which no amount key was operated and the indicator would thus not be operated to return to its zero indicating position. To overcome this difficulty the zero stop 79 is provided with a contact piece 79$^1$. (See Fig. 6). When the bobbin 78 is not energized this piece contacts with two contact pieces 132 and 133. A branch wire 134 connects the wire 128 to the contact piece 133 while a wire 135 connects the contact piece 132 to the main circuit wire 34, which includes the battery 137, and passes to the switches, as shown in Fig. 8. This construction cuts out the amount contact switches and completes the circuit independently of the same. Thus, when the machine is operated without operating an amount key in a certain bank, the zero stop of that particular bank will be actuated automatically by its springs and will thus close the circuit to energize the motor solenoids 63 of that particular bank and turn the indicator until the same is arrested by the zero stop.

In Fig. 1 there is shown a very common arrangement of machine for registering from one cent to $9.99. It is often desirable, however, to have what might be termed "combination" keys in a machine and to limit the machine to amounts that are multiples of five. This form of machine is shown in Figs. 12, 13 and 14. By reference to these figures it will be seen that the keys represent respectively 5c, 10c, 15c and so on up to $1.00 with the even and odd multiples of 5c. The dollar keys only register a capacity from 1c to $7.00. With this form of my invention when any one of the keys is operated which represents an odd multiple of 5c devices are provided for operating what might be termed a duplicate even-multiple switch and also the regular 5c switch. To accomplish this result each of the switch levers 30 pertaining to the keys which represent odd multiples of 5 is elongated so as to contact with both a switch plunger 140 corresponding to the switch plunger of the next lower even multiple key switch and wired thereto, as shown in Fig. 12, and also with a 5c contact plunger 141 as shown in Fig. 14. All of the contact plungers 141 are mounted in a metallic plate which is suitably insulated from the frame of the machine and is connected by a wire 142 to the regular 5c key contact plunger. From this construction it results that when say a 25c key is operated the circuit will be closed through a contact plunger representing 20c and also through the regular contact plunger representing 5c which results in 20c and 5c being shown on whichever form of indicator is employed. If the form of indicator shown in Fig. 5 is employed in connection with this key arrangement it will be understood that only a sufficient number of arresting bobbins will be provided to correspond with the keys of the respective banks. In other words, the units-of-cents indicator would only have bobbing for arresting it at five and zero; the tens-of-cents would have ten bobbins for causing the arrest of the indicator in nine different positions representing the even multiples of five and a tenth position, representing zero; while the units-of-dollars would only have bobbins for arresting it from zero to seven. In this instance the operation of a key representing an odd multiple of five would result in the five cent indicator and the tens-of-cents indicator both being set. If preferred, however, the form of indication shown in Fig. 11 may be used in connection with this particular keyboard arrangement. With such an arrangement the wires from the respective combination keys representing odd multiples of five would illuminate the 5c indicator and also one of the tens-of-cents indicators, which taken in connection with the 5c indicator would indicate the full amount.

If the machine is to be employed to register sales at a bar or other point without indicating in any distant room, any of the keys 82 may be utilized to unlock the machine and disconnect same from the electrical circuits simply using the key as a release key to unlock the keyboard.

While the forms of mechanism here shown and described are admirably adapted to fulfil the objects primarily stated, it is to be understood that it is not desired to confine the invention to the one form of embodiment herein disclosed, for it is susceptible of embodiment in various forms all coming within the scope of the claims which follow.

What is claimed is as follows:

1. The combination with a cash register including a series of keys, of a series of contacts controlled by said keys, a series of movable indicators, electric actuators for moving said indicators from a position indicating the previous transaction to a position indicating the characteristics of the last entry in the register and retaining same in said position until a succeeding operation of the register, electric arresting devices for said indicators, and connecting means intermediate the actuators and arresting devices and the contacts.

2. The combination with a cash register including a series of keys, of contact pieces controlled by the keys, a series of rotary indicators, electric actuators for moving said indicators from a position indicating the previous transaction to a position indicating the characteristics of the last entry in the register and retaining same in said position until a succeeding operation of the register, electric arresting devices for said indicators, and connecting means intermediate the contact pieces and the electric actuators and arresters whereby the indicators are brought to positions representing the values of the keys operated.

3. The combination with a cash register including a series of keys, of a series of contacts controlled by said keys, a series of rotary indicators, electric actuators for moving said indicators from a position indicating the previous transaction to a position indicating the characteristics of the last entry in the register and retaining same in said position until a succeeding operation of the register, a series of electrically actuated stops for the indicators for permitting a greater or less rotation of said indicators, and connecting means intermediate the electric actuators and stops and the contacts.

4. The combination with a cash register including a series of keys, of a series of contacts controlled thereby, a series of movable indicators, solenoid actuators for moving said indicators from a position indicating the previous transaction to a position indicating the characteristics of the last entry in the register and retaining same in said position until a succeeding operation of the register, solenoid stops for arresting the indicators, and connecting means intermediate the respective solenoids and the contact pieces.

5. The combination with a cash register including a series of keys, of a series of contacts, a series of indicators, a series of electric actuators, means intermediate the actuators and the indicators for moving the latter from a position indicating the previous transaction to a position indicating the characteristics of the last entry in the register and retaining same in said position until a succeeding operation of the register, arresting devices for said indicators, and connecting means intermediate the actuators and arresting devices and the contacts.

6. The combination with a cash register including a series of keys, of a series of contacts controlled thereby, a series of indicators, reciprocating actuators for said indicators, means intermediate the actuators and indicators for moving the latter from a position indicating the previous transaction to a position indicating the characteristics of the last entry in the register and retaining same in said position until the succeeding operation of the register, stop devices for said indicators, and connecting means intermediate the actuators and stop devices and the contacts.

7. The combination with a cash register including a series of keys, of a series of contacts controlled by the keys, a series of indicators, actuators for the indicators, a series of individual arresting stops for each indicator, means for controlling one of said stops of each series when the others of the series are inactive, and means connecting the stops to the contacts.

8. The combination with a cash register, of a series of keys, a series of contacts controlled by said keys, a series of indicators, actuators for said indicators, a series of magnetic stops for arresting the indicators at positions representing one to nine inclusive, further magnetic stops for arresting the indicators at zero positions, and connecting means intermediate the magnetic stops and the contacts whereby a zero stop will come into operation when no other stops of its particular series is in circuit.

9. The combination with a cash register including a series of keys, of a series of contacts controlled thereby, a series of rotary indicators, a series of reciprocating actuators, means intermediate the actuators and indicators for rotating the latter from a position indicating the previous transaction to a position indicating the characteristics of the last entry in the register and retaining same in said position until a succeeding operation of the register, a series of electric stops for said indicators, and means connecting the respective actuators and stops to the contacts.

10. The combination with a cash register including a series of keys, of a series of contacts controlled thereby, a series of rotary indicators, a series of solenoid actuators having movable cores, racks operated by said cores, connecting devices intermediate the racks and indicators for moving the latter in one direction only, stop means for arresting the indicators in different positions, and means connecting said stop means and the actuators to the contacts.

11. The combination with a cash register including a series of keys, of a series of contacts controlled by said keys, a movable member common to said keys, a main switch controlled by said member, a series of indicators, a series of indicator actuators, a series of indicator stops, and connecting means intermediate the actuators and stops and the contacts and main switch.

12. The combination with a cash register including a series of keys, of a series of contacts controlled thereby, a plurality of independent groups of indicators located at different points, selecting devices for said indicators, actuators for said indicators, stop devices for said actuators, and connecting means intermediate the selecting devices, contacts, actuators and stop devices.

13. The combination with a cash register including a series of keys, of a series of contacts controlled thereby, and a switch operated by any one of said keys to prevent sparking at the contacts and the indicators and connections controlled by said contacts.

14. The combination with a cash register including a series of keys, of a series of contacts, a movable member common to said keys, a switch operated by said member to prevent sparking at the contacts, and indicating devices controlled by said contacts.

15. The combination with a cash register including a series of keys, of a series of contacts controlled thereby, a plurality of groups of indicators located at different points, electrical means connecting the indicators and contacts, a plurality of selective devices pertaining to the respective groups of indicators, and means controlled by said selective devices for unlocking the amount keys.

16. The combination with a cash register including a series of keys, of a series of contacts controlled thereby, a plurality of groups of indicators located at different points and electrically connected to the contacts, a series of selective devices for said indicators, and a main switch included in the circuit and operated by said selecting devices.

17. The combination with a cash register including a series of keys, of a series of contacts controlled thereby, a main switch controlled by any one of the keys, a plurality of groups of indicators, a series of special keys and electrical connections operating said groups of indicators, a switch included in the circuit and operated by any one of the amount keys, and another switch included in the circuit and operated by any one of the special keys.

18. The combination with a cash register including a series of amount keys, of a series of contacts controlled thereby, a series of special keys, a series of electrical indicators controlled by the amount keys and special keys, and independent switches included in the main circuit and operated by the amount keys and special keys respectively.

19. The combination with a cash register including a series of keys, of a series of contacts controlled thereby, electrical indicators connected to said contacts, a series of special keys, and a switch controlled by said special keys whereby the operation of the indicators keys is prevented until a depressed special key has returned to its normal position.

20. In a cash register, the combination with an operating mechanism, of a series of special keys each of which is formed with two independently movable sections, electrical contacts controlled by the lower sections of the keys, independent detents for the respective sections of the keys, independent means for returning the respective sections of the keys to their normal positions, and electrical indicators controlled by said keys.

21. The combination with a cash register including a series of keys, of a series of contacts controlled thereby, a series of electrical indicators connected to the contacts, a series of special keys, means for locking the amount keys until a special key is operated, means for releasing the special keys by the operation of the amount keys, and a main switch controlled by the special keys.

22. In a cash register, the combination with a series of keys, and a corresponding series of electric circuits, of a series of contacts, in said circuits and controlled by said keys, indicators, devices actuated by said circuits and having connections to operate said indicators, and connections whereby certain ones of said keys will close the circuits controlled by a plurality of other keys.

23. In a cash register, the combination with a series of keys, of a series of contacts controlled thereby; a series of electrical indicators; individual actuators for the respective indicators; a series of electric stop devices for each indicator included in circuit with its main actuator; means connecting the stop devices, actuator and contacts in circuit; and means for completing the circuit through the actuator when no one of the said amount stop devices is energized.

24. In a cash register, the combination with a series of keys, of a series of contacts controlled thereby, a series of vertically arranged rotary indicators, a series of horizontally arranged rotary members geared to said indicators, a series of magnets for limiting the movements of said horizontal members, means connecting the magnets to the contacts, and a series of actuators also connected to the contacts for operating said horizontally movable members.

25. In a cash register, the combination with an indicator, and means for first resetting same at each operation and then moving it to show the characteristics of the last entry in the register, electrical mechanism for positively limiting the movement of said indicator, and manipulative means for controlling said electrical mechanism.

26. In an indicating device, the combination with a plurality of indicating stations each having a group of indicators; a manipulative means common to all of said indicating stations for controlling the indicating for any one of the same as desired; a transmitting medium intermediate said manipulative means and said indicating stations for controlling the latter by the former; and selective means for producing an operation of any desired indicator in any group.

27. In a cash register, the combination with a plurality of indicating stations each having a group of indicators, means for resetting same at each operation and then positioning same to exhibit the characteristics of the last entry in the register, a manipulative means common to all said stations for controlling the indication thereof, a transmitting medium intermediate said means and said stations for controlling the latter by the former, and selective means for producing an operation of any desired indicator of any group.

28. In an indicating mechanism, the combination with a plurality of indicating devices, each comprising a group of indicators, means for resetting same at each operation and then moving them to show the characteristics of the last entry in the device of key mechanism and connections common thereto for controlling the differential operation of same, and means for determining the group of indicators to be operated.

29. In an indicating mechanism, the combination with a plurality of indicating devices, each comprising a group of indicators, means for resetting same at each operation and then moving them to show the characteristics of the last entry in the device of key mechanism and connections common thereto for controlling the differential operation of same, means for determining the group of indicators to be operated, and means requiring an operation of the determining means before the key mechanism can be operated.

30. In a machine of the class described, the combination with an indicating mechanism comprising a plurality of groups of indicators, key mechanism common to all the groups, means for bringing any group under the control of the key mechanism, and means for resetting the indicators so under control at each operation and then operating the same to show the characteristics of the last entry in the device.

31. In a machine of the class described, the combination with an indicating mechanism comprising a plurality of groups of indicators, key mechanism common to all the groups, means for bringing any group under the control of the key mechanism, means for preventing the operation of the key mechanism until a group has been brought under control, means for resetting the group under control at each operation and then operating the same to show the characteristics of the last entry in the device.

32. In a machine of the class described, the combination with an indicator and connections, of a series of stops for controlling the differential adjustment of same, a series of solenoids for operating the stops, a solenoid for operating the indicator and retaining it in adjusted position until a succeeding operation of the machine, and means for simultaneously energizing said latter solenoid and one of the stop solenoids.

33. In a machine of the class described, the combination with a rotary indicator having a series of setting positions from any one of which positions it may be rotated to any other and retained in the latter position until a succeeding operation of the machine, of a plurality of adjustable stops for the indicator each one of which is appropriated to a definite setting position of the same, and a solenoid for adjusting said indicator to a position corresponding to an adjusted stop.

34. In a cash register, the combination with an indicator having a series of definite setting positions from any one of which positions it may be moved to any other and retained in the latter position until a succeeding operation of the machine, of electrical connections therefor, a solenoid energized by said connections and serving to move said indicator to any one of its positions, and a series of stops, each one of which is appropriated to a definite setting position of the indicator, and adjustable to arrest the same in such position.

35. In a machine of the class described, the combination with an indicating mechanism comprising a plurality of groups of indicators, key mechanism common to all the groups, means for bringing any group under the control of the key mechanism, and means for adjusting said group at each operation to a position differing from its zero position by an extent proportional to the value of the key depressed and retain said group in its adjusted position until a succeeding operation of the machine.

36. In a machine of the class described, the combination with an indicating mechanism comprising a plurality of groups of indicators, key mechanism common to all the groups, means for bringing any group under the control of the key mechanism, means for preventing the operation of the key mechanism until a group has been brought under control and means for adjusting such group at each operation to exhibit an indication identical with the value of the key depressed and retain said group in its adjusted position until a succeeding operation of the machine.

37. In a cash register, the combination with a differentially movable element, of an actuator therefor, a series of stops controlling the differential movement of said element by its actuator, manipulative devices, electrical circuits controlled by the manipulative devices for actuating the stops, and a spring actuated stop for said element brought into play when the manipulative devices are not operated.

38. In a cash register, the combination with a differentially movable indicator, of an actuator therefor, a stop normally arresting said indicator in zero position, a series of stops for arresting the indicator in positions other than zero, manipulative devices, and electrical circuits controlled by the manipulative devices for withdrawing the zero stop and projecting any one of the other stops into position to arrest the indicator when moved by its actuator.

39. In a cash register, the combination with a differentially movable indicator, of an actuator therefor, a stop normally arresting said indicator in zero position, a series of stops for arresting the indicator in positions other than zero, manipulative devices, and electrical circuits controlled by the manipulative devices for withdrawing the zero stop, projecting any one of the other stops into position to arrest the indicator and causing the actuator to move the indicator until arrested.

40. In a cash register, the combination with an indicator, of an operating mechanism therefor including a series of keys, contacts closed by said keys, stopping devices for controlling the movement of the indicator actuated by the closing of the contacts, and a single stopping device controlled by the stopping devices actuated by the contacts.

41. In a cash register, the combination with an indicator, of a solenoid for operating the same, and a series of solenoid stopping means for arresting the indicator in any one of a plurality of positions, one of said stopping means being controlled by the others of the series.

42. In a cash register, the combination with a plurality of electrically operated indicators, manipulative devices for controlling the operation of said indicators, and additional manipulative devices for controlling the operation of a plurality of said indicators.

43. In a cash register, the combination with a plurality of indicators, contacts controlling said indicators, manipulative devices one for each contact for closing individual circuits through said contacts, and additional manipulative devices each of which closes circuits through a plurality of contacts.

44. In a cash register, the combination with a plurality of indicators, one of said indicators being constructed to display multiples of ten and the other "zero" and "five", manipulative devices controlling the operation of the tens indicators only and additional manipulative devices controlling the operation of both of said indicators.

45. The combination with a cash register having a series of operating keys, and a member common to said keys, of a distant and structurally separate indicator, and means controlled by the keys and the member for actuating the indicator to display the amount represented by the operated keys.

46. The combination with a cash register having a series of operating keys and a member common to said keys, of a distant and structurally separate indicator, and electrical connections controlled by the keys and member for actuating the indicator to display the amount represented by the operated keys.

47. The combination with a cash register having a series of operating keys and a member common to said keys, of a distant and structurally separate indicator, means controlled by the keys and member for actuating the indicator to display the amount represented by the operated keys, and a series of manipulative devices controlling the operation of said keys.

48. The combination with a cash register having a series of operating keys and a member common to said keys, of a series of manipulative devices controlling the operation of the keys, a distant and structurally separate indicator, and means controlled by the keys, the common member and the manipulative devices for actuating the indicator to display indicia represented by the operated keys.

49. The combination with a cash register having a series of operating keys and a member common to said keys, of a series of manipulative devices controlling the operation of the keys, a distant and structurally separate indicator, and electrical connections controlled by the keys, the common member and the manipulative devices for actuating the indicator to display indicia represented by the operated keys.

50. The combination with a cash register having a series of operating keys and a member common to said keys, of a plurality of distant and structurally separate indicating stations each comprising a plurality of indicators, selective devices for determining which one of the stations shall be operated, and means controlled by the keys, the common member and the selective devices for actuating the indicators of the selected station.

51. The combination with a cash register having a series of operating keys and a member common to said keys, of a plurality of distant and structurally separate indicating stations each comprising a plurality of indicators, selective devices located at the cash register for controlling the operating keys and for determining which one of the stations shall be operated, and electrical connections controlled by the keys, the common member and the selective devices for actuating the indicators of the selected station.

In testimony whereof I affix my signature, in the presence of two witnesses.

WILLIAM F. SCHWEIGER.

Witnesses:
HARRY T. CHAMBERLIN,
CHAS. O. TITTLE.